No. 685,525. Patented Oct. 29, 1901.
A. R. OTTERMAN.
BREAST YOKE SNAP HOOK.
(Application filed Jan. 25, 1901.)
(No Model.)

Witnesses:
J. P. Appleman,
C. E. Potter.

Inventor
A. R. Otterman
By
H. C. Evert & Co.
Attys.

UNITED STATES PATENT OFFICE.

ARTHUR R. OTTERMAN, OF BRIDGEVILLE, PENNSYLVANIA.

BREAST-YOKE SNAP-HOOK.

SPECIFICATION forming part of Letters Patent No. 685,525, dated October 29, 1901.

Application filed January 25, 1901. Serial No. 44,702. (No model.)

*To all whom it may concern:*

Be it known that I, ARTHUR R. OTTERMAN, a citizen of the United States of America, residing at Bridgeville, in the county of Allegheny and State of Pennsylvania, have invented certain new and useful Improvements in Breast-Yoke Snap-Hooks, of which the following is a specification, reference being had therein to the accompanying drawings.

This invention relates to certain new and useful improvements in whiffletree and snap-hooks, and has for its object the provision of novel means whereby it is impossible for the hook to accidentally open.

The present invention further aims to construct a device of the above-described class that will be extremely simple in its construction, strong, durable, and comparatively inexpensive to manufacture.

With the above and other objects in view the invention consists in the novel combination and arrangement of parts to be hereinafter more fully described, and specifically pointed out in the claims.

In describing the invention in detail reference is had to the accompanying drawings, forming a part of this specification, and wherein like numerals of reference indicate corresponding parts throughout the several views, in which—

Figure 1:
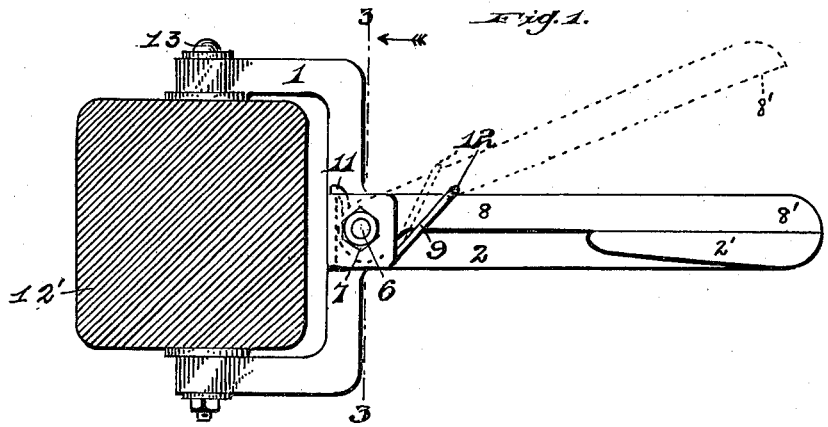
Figure 2:
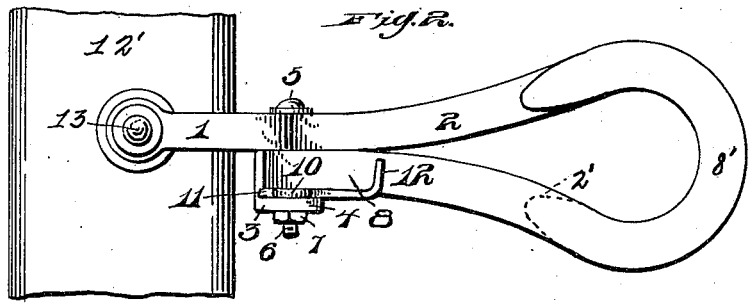
Figure 3:
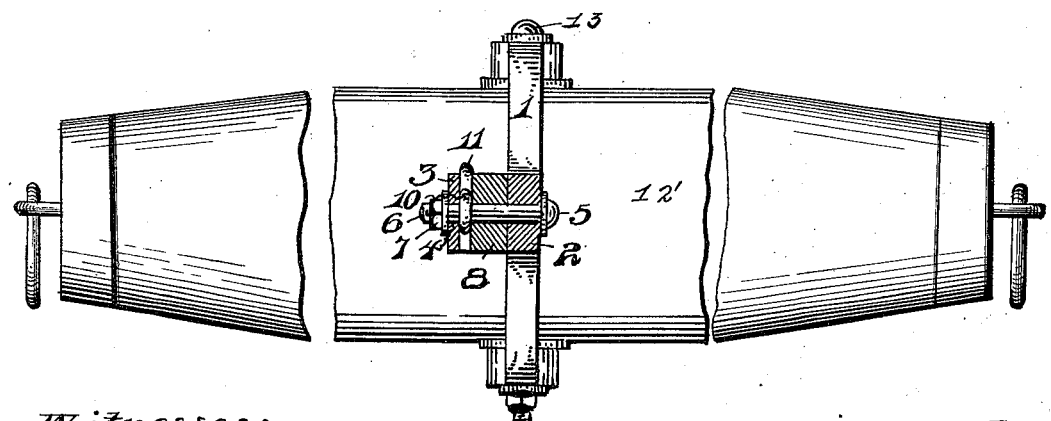

Figure 1 is a side elevation of my improved snap-hook, showing the same attached to the breast-yoke, the latter being in transverse vertical section. Fig. 2 is a top plan view of the snap-hook attached to the breast-yoke, the latter being broken away at each side of the point where the snap-hook is fastened. Fig. 3 is a transverse vertical sectional view of the snap-hook attached to the breast-yoke, taken on the line 3 3 of Fig. 1, the breast-yoke being partly broken away in this view.

In the accompanying drawings, 1 indicates a clevis which is swiveled to the breast-yoke 12', centrally of the length of said yoke, by means of a bolt 13, passed through the yoke. This clevis carries a shank 2, which terminates in a hook member 2'. The clevis also carries a substantially L-shaped bracket 3, which projects outwardly therefrom at one side thereof and is provided with an aperture in its arm 4 to receive the pivot pin or bolt 5, passed through the shank 2 and through the arm 4 of the bracket, said pivot pin or bolt having a threaded end 6 to receive a nut 7, by means of which it is secured in position. This pivot pin or bolt is also passed through the shank 8 of a hook member 8', coacting with the hook member 2'. The hook member 8' is spring-pressed, being held normally in engagement with the hook member 2' by a spring 9, having one or more coils or convolutions 10, through which the bolt 5 is passed, the coil or coils lying between the shank 8 and the inner face of the arm 4 of the bracket 3. The end 11 of this spring is engaged on the bracket 3, while the end 12 is turned at right angles and engaged upon the shank 8, so that the hook member 8' is always under the tension of the spring. The engaging faces of the two hook members are preferably flattened, as shown, so as to fit neatly together.

The operation of my improved device is as follows: When it is desired to engage the hook, the link or other object is first passed between the two sections of the hook members and then lodged in the opening. The spring will always retain the hook normally closed and an accidental disengagement will become impossible, as the strain exerted upon the hook will be against the inner sides of the hook and in a directly opposite position from the strain of the spring.

The many advantages obtained by the use of my improved device will be readily apparent from the foregoing description, taken in connection with the accompanying drawings, and it will be noted that various changes may be made in the details of construction without departing from the general spirit of my invention.

Having thus fully described my invention, what I claim as new, and desire to secure by Letters Patent, is—

1. In a breast-yoke snap-hook, the combination of a clevis carrying a hook member, a bracket or bearing rigidly secured thereto, a pivoted hook member connected thereto, a bolt passing through both hook members, and a spring secured on said bolt and bearing against said pivoted hook member, substantially as described.

2. The combination with a breast-yoke, of a snap-hook swiveled thereto and comprising a clevis, a hook member carried by said clevis, a bracket carried by the said clevis, a bolt mounted in said bracket and in the shank of the said hook member, and a spring-pressed hook member mounted on said bolt, substantially as described.

3. A breast-yoke snap-hook, comprising a clevis, a hook member carried thereby, a second hook member pivoted to the first-mentioned hook member, and a spring for holding the second hook member normally in engagement with the first-mentioned hook member, substantially as described.

In testimony whereof I affix my signature in the presence of two witnesses.

ARTHUR R. OTTERMAN.

Witnesses:
JOHN NOLAND,
E. E. POTTER.